United States Patent
Azuma

(10) Patent No.: US 6,189,641 B1
(45) Date of Patent: Feb. 20, 2001

(54) FOUR-WHEEL HYDRAULIC DRIVE SYSTEM FOR WORKING VEHICLE

(75) Inventor: Toshiro Azuma, Amagasaki (JP)

(73) Assignee: Kanzaki Kokyukoki Mfg. Co., Ltd., Amagasaki (JP)

(*) Notice: Under 35 U.S.C. 154(b), the term of this patent shall be extended for 0 days.

(21) Appl. No.: 09/292,007

(22) Filed: Apr. 15, 1999

(30) Foreign Application Priority Data

Apr. 15, 1998 (JP) .................................................. 10-104903
Jan. 29, 1999 (JP) .................................................. 11-021157

(51) Int. Cl.$^7$ ................................................ B60K 17/356
(52) U.S. Cl. .......................... 180/242; 180/244; 180/248; 180/6.2
(58) Field of Search .................................... 180/233, 242, 180/6.3, 6.48, 244, 248, 252, 305, 197, 243, 6.2; 60/420, 483, 484; 701/71

(56) References Cited

U.S. PATENT DOCUMENTS

| | | | |
|---|---|---|---|
| 4,140,196 | * 2/1979 | Brewer | 180/242 |
| 4,669,559 | 6/1987 | Fukui . | |
| 4,696,365 | 9/1987 | Ishimori et al. . | |
| 4,723,623 | 2/1988 | Teraoka et al. . | |
| 4,792,009 | * 12/1988 | Iritani | 180/233 |
| 4,798,259 | * 1/1989 | Azuma et al. | 180/233 |
| 4,856,611 | 8/1989 | Teraoka et al. . | |
| 4,862,988 | 9/1989 | Umemoto . | |
| 4,886,142 | * 12/1989 | Yamaoka et al. | 180/242 |
| 4,947,956 | * 8/1990 | Henline . | |
| 5,201,820 | * 4/1993 | Hamada et al. | 180/233 |
| 5,207,060 | * 5/1993 | Sheets | 180/242 X |
| 5,293,956 | 3/1994 | Onishi . | |
| 5,775,453 | * 7/1998 | Williams et al. | 180/197 |

FOREIGN PATENT DOCUMENTS

| | | | |
|---|---|---|---|
| 0305033 | * 12/1988 | (JP) . | |
| 0004531 | * 1/1989 | (JP) . | |
| 0004533 | * 1/1989 | (JP) . |  |
| 0004534 | * 1/1989 | (JP) . | |

* cited by examiner

Primary Examiner—Brian L. Johnson
Assistant Examiner—Bryan Fischmann
(74) Attorney, Agent, or Firm—Sterne, Kessler, Goldstein & Fox P.L.L.C.

(57) ABSTRACT

A four-wheel hydraulic drive system for a working vehicle comprising a hydraulic pump, a first hydraulic motor fluidly connected with said hydraulic pump, a pair of first driving wheels driven by said first hydraulic motor, a second hydraulic motor fluidly connected with said hydraulic pump, and a pair of second driving wheels driven by said second hydraulic motor, wherein the drive mode of said vehicle can be switched between a first four-wheel drive mode for substantially equaling the torque of said second hydraulic motor to that of said first hydraulic motor and a second four-wheel drive mode for making the torque of said second hydraulic motor smaller than that of first hydraulic motor.

4 Claims, 7 Drawing Sheets

FOUR-WHEEL HYDRAULIC DRIVE SYSTEM FOR WORKING VEHICLE

BACKGROUND OF THE INVENTION

1. Field of the Invention

The present invention relates to a four-wheel hydraulic drive system for a working vehicle including a hydraulic pump, a first hydraulic motor fluidly connected therewith so as to drive first driving wheels, and a second hydraulic motor for driving second driving wheels, wherein a braking force applied on the first driving wheels by braking devices can extend to the second driving wheels.

2. Related Art

There has been a conventional four-wheel drive working vehicle provided with a hydraulic transmission including a hydraulic pump driven by an engine and a hydraulic motor fluidly connected with the pump for driving either pair of front or rear wheels (usually, rear wheels). Such a conventional four-wheel drive vehicle has been provided under the bottom of the midsection thereof with a transmission shaft for transmitting power from the hydraulic transmission to the other pair of wheels (usually, front wheels).

As compared to a two-wheel drive vehicle, the four-wheel drive vehicle easily creates a stronger propelling force so as to be effective in climbing a hill or working in a paddy field.

In the conventional construction, the peripheral speed of the front wheels is normally set higher than that of the rear wheels so as to minimize the cornering radius of the vehicle in field. The problem has arisen that the front wheels tend to be dragged during a small radius cornering so as to prevent the vehicle from smooth cornering.

During usual travel on a flat road, such as asphalt pavement or the like, the same problem arises that the difference of peripheral speed between the front wheels and the rear wheels causes the front wheels to slip or be dragged and to wear, even if the vehicle travels in a substantially straight direction. The tendency that the front wheels are dragged is increased in proportion to the travelling speed of the vehicle. Furthermore, driving of four wheels wastes power. Therefore, a typical driver on a flat road has shut-off power transmission to the front wheels, so as to drive only the rear wheels. In other words, the driver has caused the vehicle to travel in the two-wheel drive mode during usual travel on a road. However, when the rear wheels are braked in the two-wheel drive mode, frictional resistance is only generated between the rear wheels and the road, such that the problem has arisen that the braking distance becomes longer than that in the four-wheel drive mode; wherein the braking force to the rear wheels extends to the front wheels such that frictional resistance is generated between all four wheels and the road.

Additionally, there has been the problem that a working machine of a type equipped on the bottom of the midsection of the vehicle body must be designed to avoid the intervention with the above-mentioned transmission shaft disposed under the same.

SUMMARY OF THE INVENTION

A four-wheel hydraulic drive system for a working vehicle having a pair of first driving wheels (such as rear wheels) and a pair of second driving wheels (such as front wheels), which includes a hydraulic pump and a hydraulic motor (a first hydraulic motor) fluidly connected with the pump for driving the first driving wheels, is further provided with another hydraulic motor (a second hydraulic motor) fluidly connected with the same pump for driving the second driving wheels according to the present invention, thereby omitting the conventional transmission shaft for the second driving wheels and expanding the space under the bottom of midsection of the vehicle body so as to enable a working machine to be equipped in the space.

Presupposing that the peripheral speed of the second driving wheels is set higher than that of the first driving wheels during travel in regular four-wheel drive, the four-wheel hydraulic drive system can be switched between a first four-wheel drive mode and a second four-wheel drive mode. In the first four-wheel drive mode, the torque of the second hydraulic motor is substantially identical to that of the first hydraulic motor, such that the vehicle can travel with a strong propelling force. In the second four-wheel drive mode, the torque of the second hydraulic motor is smaller than that of the first hydraulic motor, such that the vehicle can travel on a flat road at high speed without dragging and wearing of the second driving wheels. When braking devices for first driving wheels are actuated during travelling in the second four-wheel drive mode, the braking force extends to the second driving wheels so as to reduce the braking distance because the second hydraulic motor is smaller torque act as dynamic brake.

Alternatively, the four-wheel hydraulic drive system of the present invention is further provided with means which reduces the hydraulic pressure for driving the second hydraulic motor as the steering degree of the steerable second driving wheels is increased. The resultant vehicle can turn in a small cornering radius smoothly without dragging of the second driving wheels.

Besides, the four-wheel hydraulic drive system of the present invention is further provided with means which reduces the hydraulic pressure for driving the second hydraulic motor as the vehicle speed is increased. The resultant vehicle can travel on a road at high speed without dragging of the second driving wheels causing the wearing thereof while saving the cost of fuel.

Furthermore, according to the present invention, a vehicle employing the four-wheel drive system including such means for reducing the hydraulic pressure for driving the second hydraulic motor, may also include a braking device for braking the first driving wheels. In such a situation, if the braking device is actuated when the means for reducing hydraulic pressure is actuated such that hydraulic pressure to the second hydraulic motor is reduced, the hydraulic pressure to the second hydraulic motor is automatically increased. The resultant vehicle can travel at high speed with low cost of fuel as the above-mentioned, and also, when the first driving wheels are braked by the braking device, the braking force extends to the second driving wheels through the second hydraulic motor such that all four wheels are braked, thereby reducing the braking distance.

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
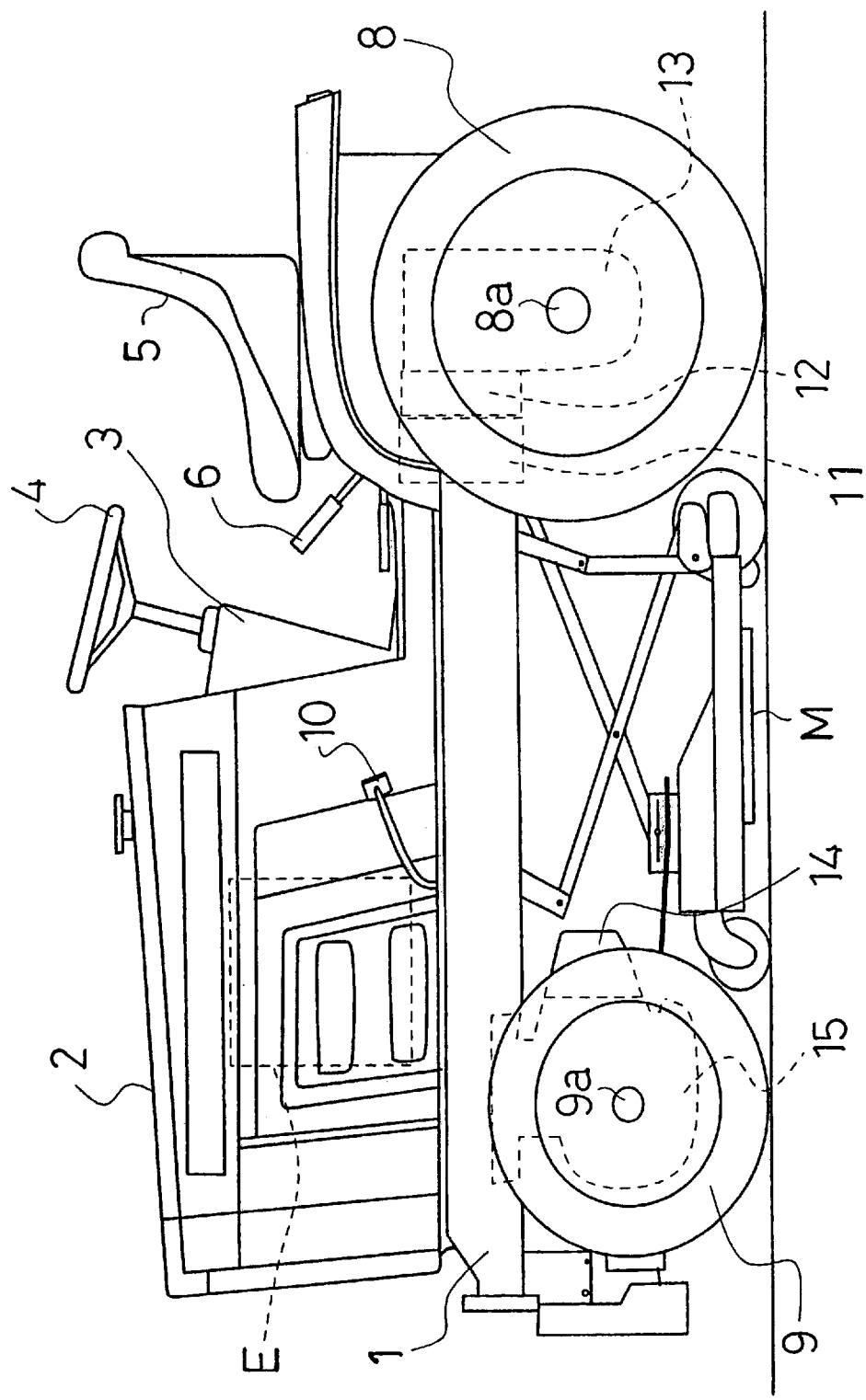
FIG. 1 is a side view of a lown mower serving as a four-wheel drive working vehicle employing the present invention.

At first, explanation will be given on a general schematic construction of a ride-on lawn mower serving as a four-wheel drive working vehicle shown in FIG. 1. Disposed on an engine frame 1 of the lawn mower is an engine E and a battery and others, which are covered with a bonnet 2. A dashboard 3 is disposed at the rear end of bonnet 2 and a steering wheel 4 is disposed over dashboard 3 for steering operation of left and right front wheels 9 serving as a pair of second driving wheels. A driver's seat 5 is disposed behind dashboard 3 with steering wheel 4. In the vicinity of dashboard 3 or seat 5 is disposed a speed changing lever 6 for changing the travelling direction and speed of the lawn mower.

Referring to a hydraulic transmission of the lawn mower in an exterior view, between the midsection and rear portion of the vehicle body are disposed a tandem connection of a hydraulic pump 11, a first hydraulic motor 12 and a rear axle casing 13. Pump 11 is drivingly connected with engine E through a universal joint, and is fluidly connected with motor 12. Left and right rear axles 8a project laterally from rear axle casing 13. Left and right rear wheels 8 serving as a pair of first driving wheels are mounted onto the outer ends of rear axles 8a. Under a front portion of engine frame 1 is disposed a front axle casing 15 with a second hydraulic motor 14 joining the rear end thereof. Left and right front axles 9a project laterally from front axle casing 15. Steerable front wheels 9 are mounted onto the outer ends of front axles 9a.

Under engine frame 1, between pump 11 and motor 14 is not disposed a conventional transmission shaft but are pipes for fluidly connection thereof, thereby creating a wide space for equipping of a working machine M.

On a footboard of a driver's cab are disposed left and right brake pedals 10 for braking rear axles 8a.

Figure 2:
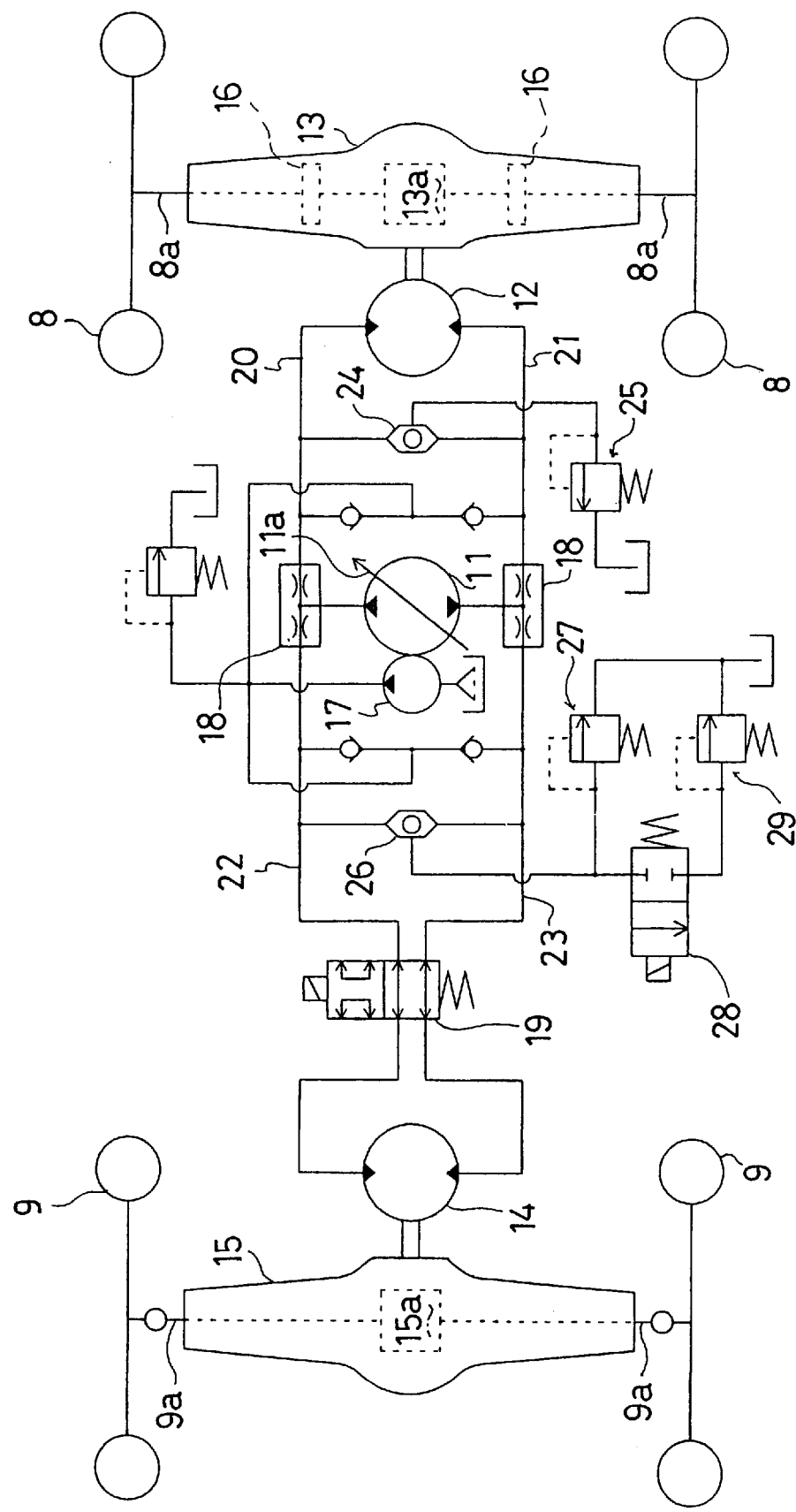
FIG. 2 is a circuit diagram of a four-wheel hydraulic drive system for a working vehicle according to a first embodiment of the present invention.

Next, referring to FIG. 2 and 3, explanation will be given on a four-wheel drive system for a working vehicle such as the lawn tractor shown in FIG. 1 according to a first embodiment of the present invention. Variable displacement hydraulic pump 11 is permanently driven by engine E. A movable swash plate 11a of pump 11 is turned according to the rotational operation of speed changing lever 6 through a mechanical linkage or an electrically controlling means. A pair of oil suction-discharge ports of pump 11 are connected with respective constant-ratio distributing valves 18. One of outlet ports of each valve 18 is fluidly connected with first hydraulic motor 12 of fixed displacement through each of oil passages 20 and 21, and the other with second hydraulic motor 14 of fixed displacement through each of oil passages 22 and 23. Oil passages 20 through 23 are formed by pipes, however, oil passages 20 and 21 may be bored in a center section to which pump 11 and motor 12 are attached, and oil passages 22 and 23 may be bored in engine frame 1. Any formation of oil passages 20 through 23 may be suitable if it can connect pump 11 with either of motors 12 and 14 fluidly.

Motor 12 is attached to rear axle casing 13, so as to drive the rear axles with rear wheels 8 through a rear differential 13a in rear axle casing 13. In rear axle casing 13 are provided a pair of braking devices 16 on respective left and right rear axles 8a, which interlock with brake pedals 10, such that, when either left or right brake pedal 10 is trod, corresponding braking device 16 is actuated so as to brake the corresponding rear axle 8a. A discharge port of a charging pump 17 is connected with oil passages 20 and 21 between pump 11 and motor 12 through respective check valves, so as to supply the lower-pressured one of oil passages 20 and 21 with hydraulic oil. Oil passages 20 and 21 are connected to inlet ports of a shuttle valve 24 interposed therebetween. An outlet port of shuttle valve 24 is connected to a relief valve 25 for regulating the torque of motor 12, so as to drain the excessive hydraulic oil beyond the limit predetermined by relief valve 25 therethrough.

Motor 14 is drivingly connected with a front differential 15a in front axle casing 15 so as to drive front axles 9a with front wheels 9. An electromagnetic first switching valve 19 is interposed between oil passages 22 and 23. When a solenoid of first switching valve 19 is not energized, valve 19 connects upstream and downstream parts of each of oil passages 22 and 23, so as to drive motor 14 by pump 11. When energized, valve 19 bypasses motor 14 and directly connects the oil suction-discharge ports of pump 11 with each other, thereby allowing front wheels 9 to be freely rotated.

The discharge port of charging pump 17 is also connected with oil passages 22 and 23 through respective check valves, so as to supply the lower-pressured one of oil passages 22 and 23 with hydraulic oil. A shuttle valve 26 is connected at its inlet ports with oil passages 22 and 23. A high-pressuring relief valve 27 and a tandem connection of an electromagnetic second switching valve 28 and a low-pressuring relief valve 29 are parallely interposed between an outlet port of shuttle valve 26 and a drained oil sump (such as an oil pan).

The hydraulic pressure for opening high-pressuring relief valve 27 is substantially the same with that for relief valve 25. When a solenoid of second switching valve 28 is not energized, valve 28 is closed so as to disconnect low-pressuring relief valve 29 from shuttle valve 26, so that the hydraulic oil pressure in a higher-pressured one of oil passages 22 and 23 is regulated to a higher level by release of excessive hydraulic oil from shuttle valve 26 through valve 27, thereby regulating the torque of motor 14 at a higher level.

The hydraulic pressure for opening low-pressuring relief valve 29 is smaller than that for high-pressuring relief valve 27. When the solenoid of the same is energized, valve 29, which has precedence to be opened over valve 27, is connected with shuttle valve 26 through valve 28, so that the hydraulic oil pressure in the higher-pressured oil passage 22 or 23 is regulated to a lower level so as to reduce the torque of motor 14.

The former situation that the torque of motor 14, when the solenoid of second switching valve 28 is not energized, is substantially equal to that of motor 12 designates a first four-wheel driving mode. The latter situation that the torque of motor 14, when the solenoid is energized, is smaller than that of motor 12 designates a second four-wheel driving mode. Each of motors 12 and 14 is fed with hydraulic oil from pump 11 so much as to substantially equalize the peripheral speed of front wheels 8 with that of rear wheels 9 or to make that of front wheels 8 higher than that of rear wheels 9 during travel in the first four-wheel drive mode.

Figure 3:
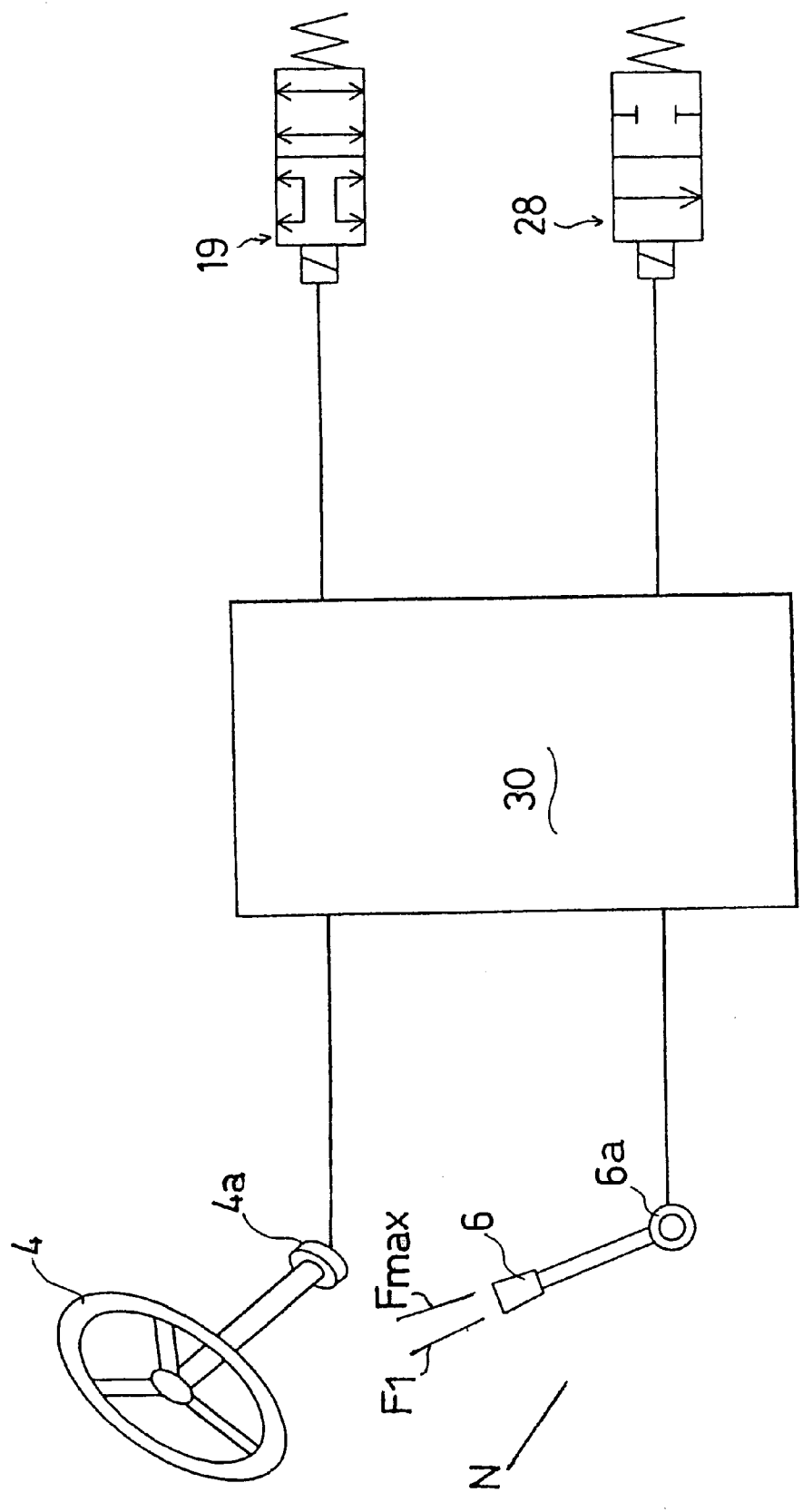
FIG. 3 is a block diagram showing a controlling system of two switching valves in the same hydraulic drive system.

As shown in FIG. 3, the solenoids of first and second switching valves 19 and 28 in parallel, a potentiometer 4a for detecting the rotational angle of steering wheel 4 and a potentiometer 6a for detecting that of speed changing lever 6 are electrically connected to a controller 30 loaded on the vehicle. Controller 30 computes the detected values of both potentiometers 4a and 6a inputted thereinto in comparison with the respective reference values, thereby controlling the solenoids of valves 19 and 28. Otherwise, first and second switching valves 19 and 28 may be mechanically switchable.

In this embodiment is provided potentiometer 4a on the base end of a stem of steering wheel 4, however, a sensor for detecting the steering angle of front wheels 9 is not limited in its installation location and kind. Similarly, since it is essential only that the rotational degree of speed changing lever 6 can be detected, a sensor different from potentiometer 6a in its installation location and kind may be employed.

When potentiometer 4a detects that the rotational angle of steering wheel 4 is beyond a predetermined angle, or that the steering angle of front wheels 9 exceeds a predetermined value, the solenoid of first switching valve 19 is energized so as to hydraulically disconnect motor 14 from pump 11, so that front wheels 9 are freely rotatable and only rear wheels 8 are driven. Therefore, front wheels 9 are prevented from being dragged on a road under the frictional resistance generated between front wheels 9 and the road surface due to a peripheral speed difference between front wheels 9 and rear wheels 8, so that the resulting vehicle can smoothly turn in a smaller radius.

When potentiometer 6a detects that speed changing lever 6 is apart from a neutral position N and is positioned between a predetermined position F1 and a maximum high speed position Fmax, controller 30 energizes the solenoid of second switching valve 28 so as to effectively connect low-pressuring relief valve 29 with shuttle valve 26, thereby making the torque of motor 14 smaller than that of motor 12. Therefore, even if the vehicle in four-wheel drive is travelling at high speed on a flat road such as an asphalt pavement, front wheels 9 driven by motor 14 with the smaller torque than that of motor 12 can be free from the above-mentioned dragging, so that apparently the vehicle travels as the same as in two-wheel drive. However, the driving force is still transmitted to front wheels 9, so that, when rear wheels 8 are braked, the braking force thereto is also exerted to front wheels 9, thereby reducing the braking distance of the vehicle.

Figure 4:
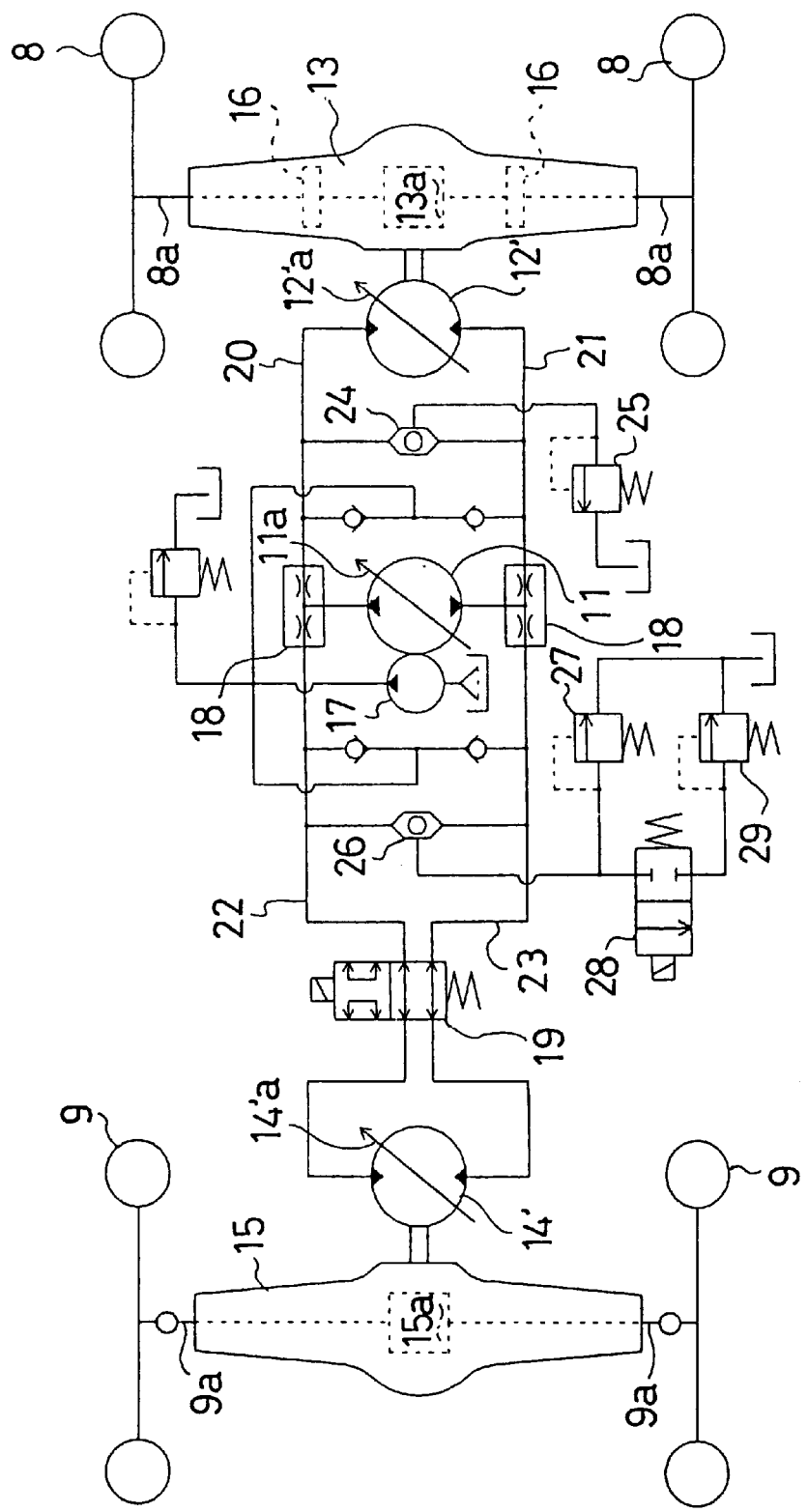
FIG. 4 is a circuit diagram of a four-wheel hydraulic drive system including variable displacement hydraulic motors for a working vehicle according to a second embodiment of the present invention.

Explanation will next be given on a second embodiment of the present invention in accordance with FIGS. 4 and 5. As shown in FIG. 4, except that variable displacement hydraulic motors 12' and 14' replace fixed displacement hydraulic motor 12 and 14 of the first embodiment, the hydraulic circuit of the second embodiment is identical to that of the first embodiment.

Figure 5:
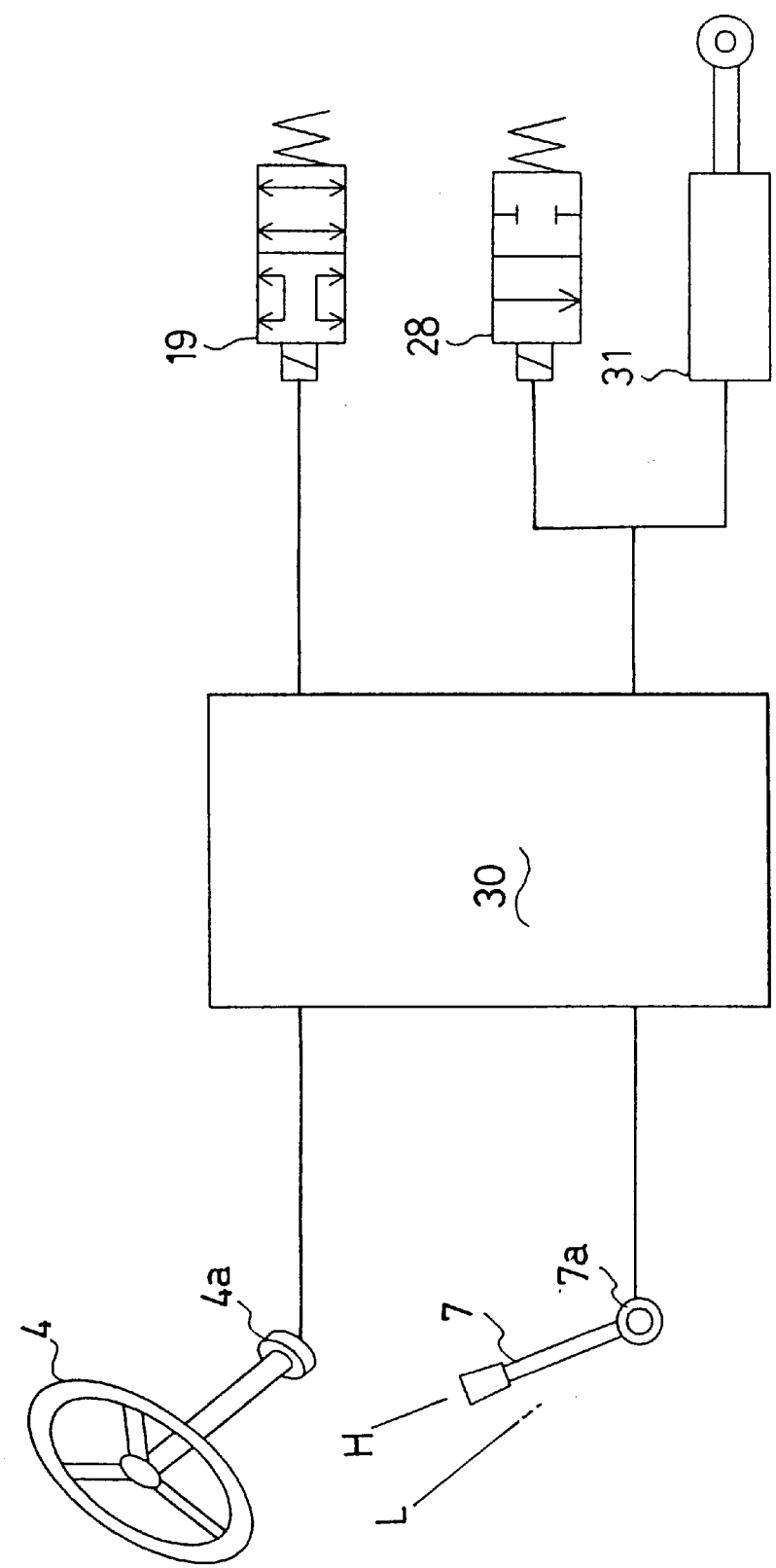
FIG. 5 is a block diagram showing a controlling system of the two switching valves and an actuator for changing the capacities of the hydraulic motors in the same hydraulic drive system.

As shown in FIG. 5, the vehicle according for the second embodiment is provided with a sub speed changing lever 7, which can be shifted to either a low speed position L or a high speed position H for changing the capacities of motors 12' and 14', in addition to speed changing lever 6. To the analog-digital converter of controller 30 is connected a potentiometer 7a for detecting the rotational angle of sub speed changing lever 7 replacing potentiometer 6a, in addicction to potentiometers 4a, and to the digital-analog converter thereof is connected an actuator 31 like a solenoid or an electrically powered cylinder for location of each of movable swash plates 12'a and 14'a of motors 12' and 14' between two tilt angles, besides solenoids of first and second switching valves 19 and 28.

Similarly with the first embodiment, when steering wheel 4 is rotated beyond the predetermined rotational angle, first switching valve 19 is switched by detection of potentiometer 4a so as to cut off the oil flowing from pump 11 to motor 14', thereby making front wheels 9 freely rotatable.

When sub speed changing lever 7 is located in high speed position H, actuator 31 is actuated so as to locate movable swash plates 12'a and 14'a of motors 12' and 14' to their high speed tilt angles for reduction of the capacities of motors 12' and 14', thereby increasing the travelling speed of the vehicle, and simultaneously, the solenoid of second switching valve 28 is energized so as to make low-pressuring relief valve 29 operable, thereby making the torque of motor 14' less than that of motor 12'.

When sub speed changing lever 7 is located in low speed position L, actuator 31 is actuated conversely to the above so as to locate movable swash plates 12'a and 14'a of motors 12' and 14' to their low speed tilt angles for increase of the capacities of motors 12' and 14', thereby reducing the travelling speed of the vehicle, and simultaneously, the solenoid of second switching valve 28 is not energized so as to make high-pressuring relief valve 27 operable, thereby nearly coinciding the torque of motor 14' with that of motor 12'.

Figure 6:
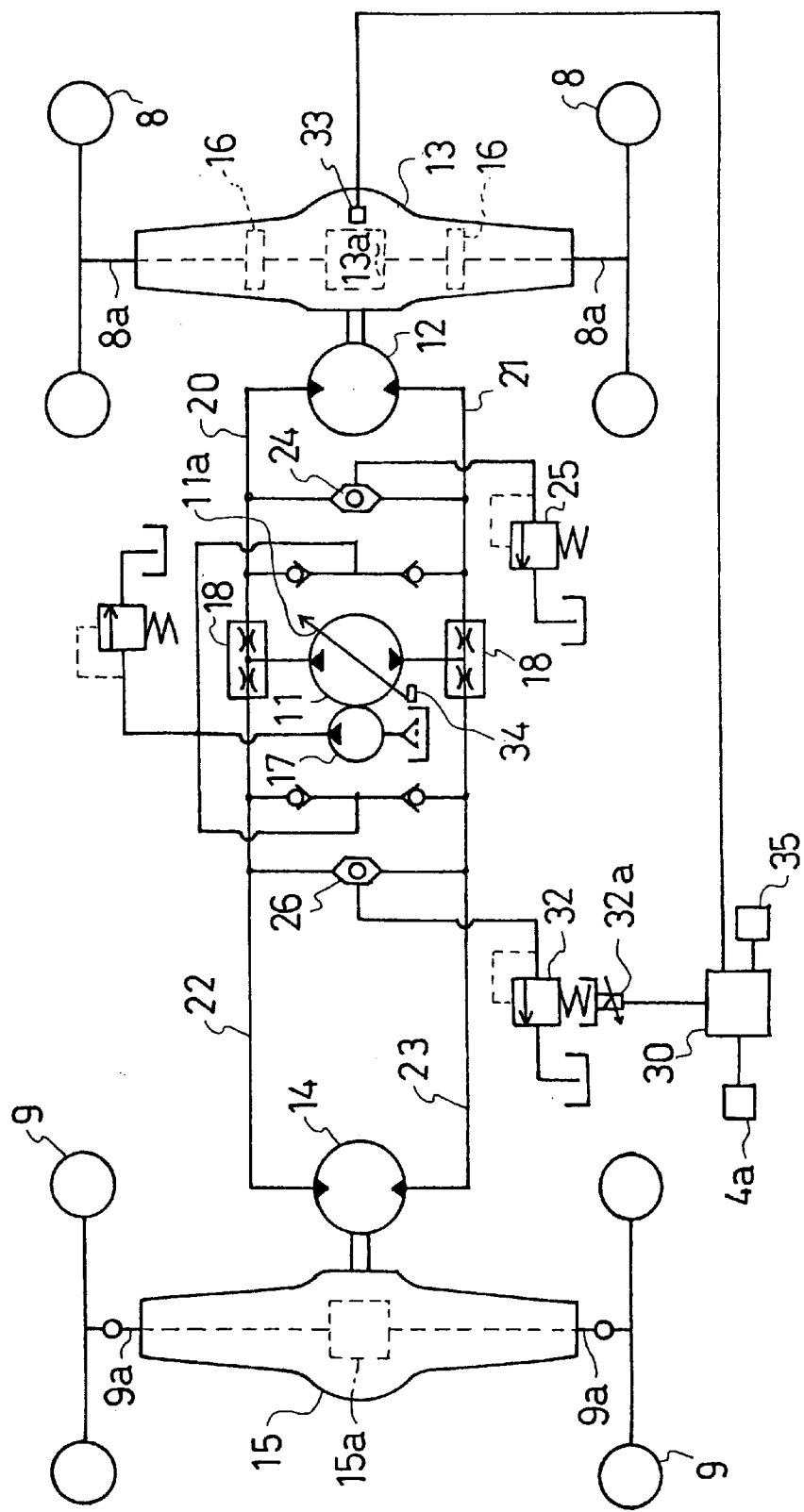
FIG. 6 is a circuit diagram, partly elemental and partly block, of a four-wheel hydraulic drive system for a working vehicle according to a third embodiment of the present invention.

Next, explanation will be given on a third embodiment in accordance with FIGS. 6, 7 and 8. As shown in FIG. 6, fixed displacement hydraulic motors 12 and 14 are used similarly to the first embodiment. First switching valve 19 as the above-mentioned is omitted so as to directly connect motor 14 with pump 11 through oil passages 22 and 23 and distributing valves 18. The outlet port of shuttle valve 26 is connected with an electromagnetic variable relief valve 32 serving as a means for changing the torque ratio of motor 14 to motor 12, instead of second switching valve 28 and relief valves 27 and 29. Other components are the same as those of the hydraulic circuit in the first embodiment.

Figure 7:
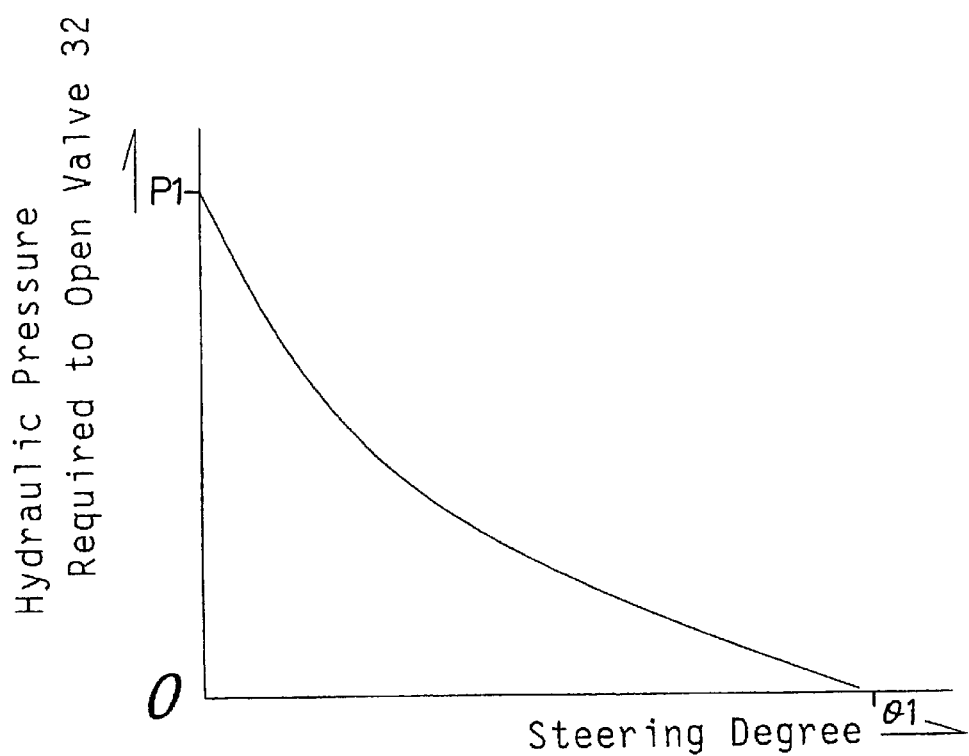
FIG. 7 is a graph showing a variation of hydraulic pressure required to open a variable relief valve of the same hydraulic drive system in relation to the steering degree.
Figure 8:
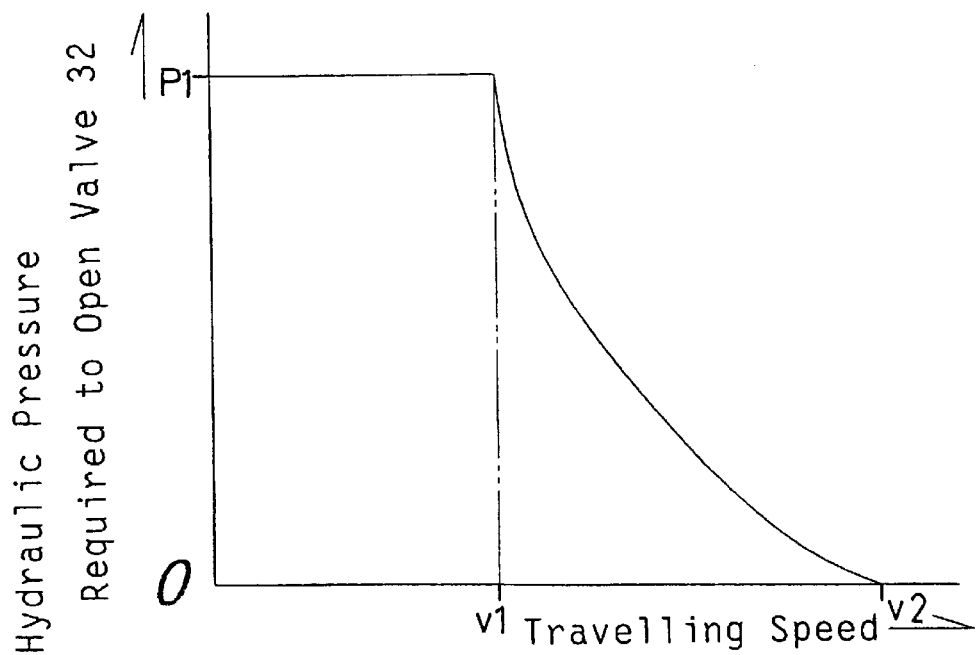
FIG. 8 is a graph showing a variation of hydraulic pressure required to open the same variable relief valve in relation to the vehicle speed.

A predetermined hydraulic pressure for opening variable relief valve 32 during straight and slow travelling of the vehicle is P1, as shown in FIGS. 7 and 8. An action of a solenoid 32a of valve 32 electrically connected with the digital-analog converter of controller 30 is proportionally controlled so as to reduce a hydraulic pressure required for opening valve 32 from predetermined pressure P1 in inversely proportion to increase of either steering angle or travelling speed. The hydraulic pressure required to open valve 32 may be changed by a desirably slidable spool of a cylinder or the like. Besides potentiometer 4a, a speed sensor 33 for detecting the vehicle speed is connected to the analog-digital converter of controller 30. Speed sensor 33, as shown in FIG. 6, detects a rotational tooth number of gear in rear axle casing 13 or the number of rotary of rear wheels 8 per unit time, thereby detecting the output rotary speed of motor 12.

Instead of speed sensor 33, an angle sensor 34 provided on a pivotal portion of swash plate 11a of pump 11 for detecting the tilt angle thereof, or a sensor for detecting a rotational degree of a throttle lever of engine E may be electrically connected with controller 30.

Additionally, sensors 35 provided on pivotal shafts of left and right brake pedals 10 for detecting whether both pedals 10 are trod or not are electrically connected to controller 30.

Referring to FIG. 7, as steering wheel 4 is further rotated during travelling, solenoid 32a of variable relief valve 32 is actuated so that the hydraulic pressure required to open valve 32 is reduced from predetermined pressure P1 in inverse proportion to the value detected by potentiometer 4a, thereby reducing the amount of hydraulic oil fed to motor 14. Thus, the driving forces of front wheels 9 are reduced so as to prevent them from being dragged. Finally, when steering wheel 4 is rotated beyond an angle θ 1, front wheels 9 are made to be freely rotatable, so that the vehicle can turn in a small radius smoothly.

Referring to FIG. 8, while the vehicle is travelling at low speed less than v1, the hydraulic pressure required to open valve 32 is kept to be predetermined pressure P1. As the travelling speed of the vehicle is increased beyond vi by operation of speed changing lever 6 or the throttle lever, solenoid 32a is energized to reduce the hydraulic pressure to open valve 32 in inversely proportion to the value of vehicle speed detected by sensor 33. Finally, when the travelling speed exceeds v2, front wheels 9 are made to be freely rotatable.

Thus, when the vehicle in four-wheel drive travels on a flat road like an asphalt pavement at middle or high speed, the torque of motor 14 less than the frictional resistance generated between front wheels 9 and the road surface is transmitted to front wheels 9, thereby preventing front wheels 9 from being dragged. The vehicle travelling at high speed over v2 is automatically driven in two-wheel drive.

When brake pedals 10 are trod for stopping the vehicle while travelling, both sensors 35 are switched so as to make solenoid 32a not energized, thereby returning the hydraulic pressure for opening valve 32 to predetermined pressure P1. Thus, the hydraulic pressure determined by speed changing lever 6 or the throttle lever is fed into motor 14, so that a dynamic brake corresponding to the engine brake intensely exerts the brake action onto front wheels 9 together with rear wheels 8, thereby reducing the braking distance of the vehicle.

What is claimed is:

1. A four-wheel hydraulic drive system for a working vehicle comprising:
   a variable displacement hydraulic pump;
   a first fixed displacement hydraulic motor fluidly connected with said hydraulic pump;
   a pair of first driving wheels driven by said first hydraulic motor;
   a second fixed displacement hydraulic motor fluidly connected with said hydraulic pump;
   a pair of second driving wheels driven by said second hydraulic motor; and
   means for changing the torque of said second hydraulic motor, wherein said means substantially equalizes the torque of said second hydraulic motor to that of said first hydraulic motor for providing a first four-wheel drive mode of said vehicle, and reducing the torque of said second hydraulic motor to be smaller than that of said first hydraulic motor for providing a second four-wheel drive mode of said vehicle.

2. A four-wheel hydraulic drive system for a working vehicle comprising:
   a variable displacement hydraulic pump;
   a first fixed displacement hydraulic motor fluidly connected with said hydraulic pump;
   a pair of first driving wheels driven by said first hydraulic motor;
   a second fixed displacement hydraulic motor fluidly connected with said hydraulic pump;
   a pair of steerable second driving wheels driven by said second hydraulic motor; and
   means for changing the hydraulic pressure to drive said second hydraulic motor, wherein, as the angle of said second driving wheels from their longitudinal direction during cornering is increased, said means reduces the hydraulic pressure to drive said second hydraulic motor.

3. A four-wheel hydraulic drive system for a working vehicle comprising:
   a variable displacement hydraulic pump;
   a first fixed displacement hydraulic motor fluidly connected with said hydraulic pump;
   a pair of first driving wheels driven by said first hydraulic motor;
   a second fixed displacement hydraulic motor fluidly connected with said hydraulic pump;
   a pair of second driving wheels driven by said second hydraulic motor; and
   means for changing the hydraulic pressure to drive said second hydraulic motor, wherein, as the travelling speed of said vehicle is increased, said means reduces the hydraulic pressure to drive said second hydraulic motor.

4. A four-wheel hydraulic drive system for a working vehicle comprising:
   a variable displacement hydraulic pump;
   a first fixed displacement hydraulic motor fluidly connected with said hydraulic pump;
   a pair of first driving wheels driven by said first hydraulic motor;
   a second fixed displacement hydraulic motor fluidly connected with said hydraulic pump;
   a pair of second driving wheels driven by said second hydraulic motor;
   means for changing the hydraulic pressure to drive said second hydraulic motor, wherein, as the travelling speed of said vehicle is increased, said means reduces the hydraulic pressure to drive said second hydraulic motor; and
   a braking device for braking said first driving wheels, wherein, when said braking device is actuated during travel in the state that the hydraulic pressure to drive said second hydraulic motor has been reduced, said hydraulic pressure is increased simultaneously.

* * * * *